(12) United States Patent
Tetzlaff (10) Patent No.: US 8,932,373 B2
(45) Date of Patent: Jan. 13, 2015

(54) METHOD AND DEVICE FOR USING OXYGEN IN THE STEAM REFORMING OF BIOMASS

(76) Inventor: Karl-Heinz Tetzlaff, Kelkheim (DE)

(*) Notice: Subject to any disclaimer, the term of this patent is extended or adjusted under 35 U.S.C. 154(b) by 0 days.

(21) Appl. No.: 13/393,698

(22) PCT Filed: Sep. 3, 2010

(86) PCT No.: PCT/EP2010/005408
§ 371 (c)(1),
(2), (4) Date: May 14, 2012

(87) PCT Pub. No.: WO2011/026630
PCT Pub. Date: Mar. 10, 2011

(65) Prior Publication Data
US 2012/0217440 A1 Aug. 30, 2012

(30) Foreign Application Priority Data
Sep. 3, 2009 (DE) .......................... 10 2009 039 920

(51) Int. Cl.
*C01B 3/00* (2006.01)
*C10J 3/00* (2006.01)
*F23L 7/00* (2006.01)
*C10J 3/80* (2006.01)
*B01J 8/28* (2006.01)
*C10J 3/50* (2006.01)
*C10J 3/66* (2006.01)
(Continued)

(52) U.S. Cl.
CPC .............. *B01J 8/1818* (2013.01); *F23L 7/007* (2013.01); *C10J 3/80* (2013.01); *B01J 8/28* (2013.01); *C10J 2300/0959* (2013.01); *C10J 2300/1276* (2013.01); *C10J 2200/09* (2013.01); *C10J 3/503* (2013.01); *Y02E 20/344* (2013.01); *C10J 3/66* (2013.01); *F23C 10/20* (2013.01); *B01J 8/0055* (2013.01); *B01J 2208/00522* (2013.01); *B01J 8/009* (2013.01); *C10J 2300/0956* (2013.01); *B01J 2208/00513* (2013.01)
USPC ............................................... 48/61; 422/139

(58) Field of Classification Search
USPC ....................................... 48/61; 431/326–328
See application file for complete search history.

(56) References Cited

U.S. PATENT DOCUMENTS

| 3,341,648 A | 9/1967 | Molstedt |
| 4,982,068 A | 1/1991 | Pollock |

(Continued)

FOREIGN PATENT DOCUMENTS

| CN | 2499385 Y | 7/2002 |
| CN | 101394924 A | 3/2009 |

(Continued)

OTHER PUBLICATIONS

Nussbaumer, 7th Wood Energy Symposium, Keeping air clean and protecting against explosions for wood-fired firing systems and the prior art in wood gasification, Energieschweiz, (Oct. 18, 2002), Swiss Federal Institute of Technology, Zurich (ARTICLE)(English-Language Translation attached).

*Primary Examiner* — Matthew Merkling
(74) *Attorney, Agent, or Firm* — The Webb Law Firm (57) ABSTRACT

The invention relates to a device for using oxygen for the thermochemical gasification of biomass in at least one fluidized-bed reactor, a heating system being located in the fluidized bed of said reactor and the fluidized-bed reactor being heated by the at least partial oxidation of a combustible gas using oxygen.

11 Claims, 9 Drawing Sheets

(51) Int. Cl.
*F23C 10/20* (2006.01)
*B01J 8/00* (2006.01)
*B01J 8/18* (2006.01)

(56) References Cited

U.S. PATENT DOCUMENTS

| | | | |
|---|---|---|---|
| 5,117,482 A | 5/1992 | Hauber | |
| 5,632,858 A | 5/1997 | Kitto, Jr. | |
| 6,149,765 A * | 11/2000 | Mansour et al. | 162/29 |
| 7,021,223 B2 | 4/2006 | Meyer et al. | |
| 7,267,804 B2 * | 9/2007 | Buxbaum | 422/168 |
| 2005/0166457 A1 | 8/2005 | Steer | |
| 2009/0018373 A1 | 1/2009 | Werth et al. | |
| 2011/0083367 A1 | 4/2011 | Tetzlaff | |
| 2012/0091395 A1 | 4/2012 | Tetzlaff | |

FOREIGN PATENT DOCUMENTS

| | | |
|---|---|---|
| DE | 19807988 A1 | 2/1998 |
| DE | 10222604 A1 | 5/2002 |
| DE | 10242594 A1 | 9/2002 |
| DE | 102008014799 A1 | 3/2008 |
| DE | 102008032166 A1 | 7/2008 |
| JP | 6347691 A | 12/1988 |
| JP | 533913 A | 2/1993 |
| JP | 2000510889 A | 8/2000 |
| JP | 2001165408 A | 6/2001 |
| JP | 2001235129 | 8/2001 |
| JP | 2005330370 A | 12/2005 |
| WO | 9110867 A1 | 7/1991 |

* cited by examiner

METHOD AND DEVICE FOR USING OXYGEN IN THE STEAM REFORMING OF BIOMASS

BACKGROUND OF THE INVENTION

1. Field of the Invention

The invention relates to a fluidised bed reactor for the gasification and/or pyrolysis of solid fuels, preferably biomass, having a heater for heating the fluidised bed of the fluidised bed reactor, the heater having at least one cavity. The invention furthermore relates to a method for the gasification and/or pyrolysis of solid fuels, preferably biomass, in a fluidised bed reactor, preferably of the type mentioned above.

2. Description of Related Art

The first step in the production of synthesis gas from biomass by means of steam reforming is endothermic. Energy must therefore be input into the process. This can be done by partial combustion of the biomass. The delivery of oxygen into a reactor at a temperature level of about 800° C. is not simple, however, because owing to a large oxygen supply, temperatures can be reached locally which are so high that they cause melting of the ash components of the biomass. For this reason, either the oxygen must be diluted with steam or nitrogen or the biomass must be provided as a small fraction in the inert bed material in the form of small coke particles, which transmit the heat to the bed material. Fluidised bed reactors are therefore usually operated with air.

The best-known industrial plant of this type is located in Güssing, Austria (see: Zweibett Wirbelschichtvergasung in Güssing mit 2 $MW_{el}$/4.5 $MW_{th}$ [Two-bed fluidised bed gasification in Güssing with 2 MWe/4.5 MWth]; R. Rauch, H. Hofbauer; Holzenergiesymposium [Wood energy symposium] 18, Oct. 2002, ETH Zurich, Switzerland). This plant has two fluidised bed reactors, which are connected to one another by a sand circuit. The reactor, referred to as a burner, is operated with air. Here, the coke particles are burnt and the circulating sand bed is heated to approximately 950° C. The temperature of the coke particles under these oxidising conditions may be more than 1100° C. This type of reactor can therefore be operated safely only with wood. Using biomass of the crop type, owing to its low ash melting point, would lead to clumping of the sand.

For pressurised gasification, as would be advantageous for the production of hydrogen, this type of reactor is less suitable.

In principle, fluidised bed reactors may also be operated autothermally by direct delivery of pure oxygen. In practice, however, the ash melting point of biomass is exceeded in this case even if the oxygen is diluted to one half with steam. Autothermal operation then requires a particular configuration of the oxygen feed, as disclosed in DE 102 42 594 A1, and special extraction for the molten ash. This ash cannot be reused as inorganic fertiliser.

With pure oxygen, neither allothermal operation as of the Güssing type nor autothermal operation by injecting pure oxygen is possible without exceeding the ash melting point. Even an oxygen content of 21% (air) is problematic.

SUMMARY OF THE INVENTION

It is an object of the invention to avoid the aforementioned disadvantages and to permit the use of oxygen for the gasification of biomass in fluidised bed reactors. In particular, the intention is to make pure oxygen usable for the steam reforming of biomass with a low ash melting point.

According to the invention, the heater thus has an oxygen feed for delivering a gas containing oxygen into the cavity of the heater, and the cavity adjoins a porous, gas-permeable section of the heater. This allows controlled oxidation by means of the oxygen of a gas containing oxygen. It may, for instance, be air. Technically pure oxygen, however, is preferred. The porous and gas-permeable section can also achieve the effect that the gas containing oxygen comes in contact with a combustible gas and consequently oxidises it, without coke particles of the fluidised bed simultaneously being able to react directly with the oxygen. The coke particles are consequently in any event predominantly kept away from the oxidation zone.

The heater may be formed in a wide variety of ways. Owing to the porous configuration, however, for cost reasons it is particularly preferable for the heater to comprise at least one tube, and in particular a plurality of tubes. For the sake of simplicity, merely tubes per se will often be mentioned below. Without repeatedly mentioning it, as an alternative to the tubes it is also possible to provide only one tube or, as an alternative or in addition, a different configuration of the heater.

According to the method, the gas containing oxygen is delivered to a cavity of a heater and the gas containing oxygen and/or a combustible gas flows through the porous, gas-permeable section of the heater. The combustible gas is oxidised at least partially by the gas containing oxygen while releasing heat. The heat of oxidation is then transferred to the fluidised bed of the fluidised bed reactor.

For the sake of simplicity, further refinements of the device and the method will be described together below; the person skilled in the art will respectively recognise the special device features and method features of the refinements.

In a first preferred configuration of the fluidised bed reactor, the tubes are preferably provided in the fluidised bed reactor, at least various tubes being formed as at least partially porous, gas-permeable tubes. This allows suitable guiding of the gases involved. It is thus not absolutely necessary for every tube to be porous and gas-permeable, and they also need not be continuously porous and gas-permeable.

In a particularly preferred fluidised bed reactor, the heater comprises a plurality of tubes arranged concentrically with one another. A plurality of groups of at least two tubes are thus provided, which are in each case provided concentrically with one another. Here, of course, an exactly concentric mutual arrangement is not essential. An inner tube and an outer tube are provided in each group of tubes, at least the inner tube or the outer tube being formed so that it is porous and gas-permeable. In this way, an annular space, in which further fixtures may be provided, is obtained between the inner tube and the outer tube. The annular space may be used as a further flow channel for suitable flow guidance of the gases involved.

With such an arrangement of the tubes, the oxygen feed may be formed so as to deliver the gas containing oxygen to the inner tube. The oxidation of the combustible gas may then take place in the annular space in the absence of coke particles, since they cannot enter the annular space. The outer tube may also act as shielding against the optionally very elevated temperature in the annular space, so that the ash melting point of the coke particles cannot be exceeded in the fluidised bed.

If the combustible gas does not enter the annular space from the fluidised bed through the correspondingly porous and gas-permeable outer tube, but is delivered directly to the annular gap from the outside, then the gas containing oxygen may also be delivered to the annular space between the outer tube and the inner tube. The oxygen can then be kept further away from the outer tube, so that undesired reactions can be avoided or at least reduced.

The combustible gas feed for delivering combustible gas may be provided so that the combustible gas is delivered to the inner tube or to the annular space between the outer tube and/or the inner tube. In this way, it is possible to ensure that the combustible gas can be delivered to the heater according to the preferred method management.

In order for instance to be able to deliver combustible gas from the fluidised bed to the heater, or in order to be able to deliver oxygen-containing or oxidised gas from the heater to the fluidised bed, both the respective inner tube and the respective outer tube may be formed so as to be porous and gas-permeable.

At least one further, preferably porous and gas-permeable tube and/or at least one optionally gas-permeable heat protection shield may optionally be provided between the outer tube and the inner tube. This may, for example, be used for heat shielding in relation to the coke particles in the fluidised bed.

If mixing of the gas of the heater with the gas of the fluidised bed is intended to be avoided, the outer tube may be enclosed by at least one gas-impermeable casing. The casing is then, so to speak, heated from the inside by the oxidation of the combustible gas and transfers the corresponding heat to the fluidised bed. The casing may itself be formed as a concentric tube.

In a fluidised bed reactor which is formed simply in design terms, the oxygen feed may comprise a nozzle floor for delivering gas containing oxygen to the cavity and simultaneously for delivering fluidisation gas to the fluidised bed of the fluidised bed reactor.

The combustible gas feed may likewise be integrated into the nozzle floor, in order simultaneously to deliver the gas containing oxygen and the combustible gas to the cavity of the heater and the fluidisation gas to the fluidised bed of the fluidised bed reactor.

The heater is preferably provided in a stationary fluidised bed and/or a circulating fluidised bed. There, the heat transfer is particularly good and significantly better than outside the fluidised bed. The fluidised bed may comprise an inert bed material. This may, however, also be obviated so that, for example, the fluidised bed is formed by coke particles. This is referred to as a coke cloud. The coke particles can be supplied well with heat by means of the heater, for instance for steam reforming.

If the porous, gas-permeable section of the heater, preferably the at least one porous, gas-permeable tube, at least locally comprises a catalyst material and/or is made of a catalyst material, then catalytic conversion of tars can take place. To this end, a pyrolysis gas containing tar is preferably used as the combustible gas, which is formed in a pyrolysis reactor in a method step upstream of the fluidised bed reactor. The combustible gas may then, preferably after partial oxidation of it, flow through the porous, gas-permeable section and thereby come in contact with the catalyst.

Without losing the advantages described above, the effectiveness of the heater can be increased if the porous, gas-permeable section, in particular a porous, gas-permeable tube, is formed so that it can be heated electrically. In this case, the porous, gas-permeable section, in particular the porous, gas-permeable tube, may optionally be used as a heating resistor. It is then preferable for the porous, gas-permeable section, in particular the porous, gas-permeable tube, to be formed from a metallic, electrically conductive material. It is not necessary, however, for every porous, gas-permeable section or every porous, gas-permeable tube to be electrically heatable. Particularly in the case of tubes arranged concentrically with one another, it may be sufficient for an inner tube and/or an outer tube to be electrically heatable.

Provision may also be made for the heating resistor to be segmented over the height of the fluidised bed reactor, so that the electrical heating power of the heater can be adjusted and/or controlled in the corresponding segments independently of one another. Segmented heaters may, in particular, be expedient when the fluidised bed reactor is also subdivided into different sections, for instance by using perforated metal sheets. The perforated metal sheets may then, for example, be used for the voltage supply of the individual electrical segments of the heater.

According to the method, in a particularly preferred exemplary embodiment, the gas containing oxygen flows through the porous, gas-permeable section of the heater in the direction of the fluidised bed of the fluidised bed reactor, and oxidises the combustible gas in the fluidised bed in the porous, gas-permeable section and/or immediately next to the side of the porous, gas-permeable section facing the fluidised bed. This achieves spatial separation of the oxidation and the coke particles, so that exceeding of the ash melting temperature can be avoided. Furthermore, the porous, gas-permeable section of the heater is deliberately heated by the oxidation and then transfers the corresponding heat to the fluidised bed, in particular the coke particles, for example by means of thermal radiation.

An alternative, the combustible gas of the fluidised bed of the fluidised bed reactor may flow through the porous, gas-permeable section of the heater in the direction of the cavity of the heater, and be oxidised by the gas containing oxygen in the porous, gas-permeable section of the heater and/or in the cavity of the heater. The advantages mentioned above are also achieved in this case.

In another method alternative, the gas containing oxygen is delivered to at least one inner porous and gas-permeable tube, the gas containing oxygen flowing through the pore system of the inner tube in an annular space between the inner tube and a porous, gas-permeable outer tube, and the combustible gas being delivered to the annular space between the inner tube and the outer tube. The combustible gas is finally oxidised by the gas containing oxygen in the annular space, then the at least partially oxidised gas emerges from the heater through the pore system of the outer tube. The at least partially oxidised gas preferably flows into the fluidised bed reactor, in order to heat it. In particular, the at least partially oxidised gas flows into the fluidised bed of the fluidised bed reactor, where the heat of the at least partially oxidised gas is transferred to the coke particles.

In this context, the at least partially oxidised gas may flow through a porous, gas-permeable tube and/or a heat protection shield between the inner tube and the outer tube, preferably into the fluidised bed reactor, more preferably into the fluidised bed of the fluidised bed reactor. Better heat shielding in relation to the coke particles is achieved in this way. An excessive temperature increase, which leads to melting of the ash contained in the coke particles, can thus be avoided.

In a preferred method alternative, the gas containing oxygen is delivered to at least one inner porous and gas-permeable tube, from where it flows through the pore system of the inner tube into an annular space between the inner tube and an outer tube. The annular space is furthermore supplied with combustible gas, which is oxidised there by the gas containing oxygen. The gas at least partially oxidised in this way is extracted from the fluidised bed reactor via a discharge, and not directly introduced into the fluidised bed of the fluidised bed reactor. Corresponding mixing can be prevented in this way.

As an alternative, the combustible gas may be delivered to at least one inner porous and gas-permeable tube and flow through the pore system of the inner tube into an annular space, between the inner tube and an outer tube, to which the gas containing oxygen is delivered. The combustible gas is therefore oxidised by the gas containing oxygen in the annular space. The at least partially oxidised gas is then extracted from the fluidised bed reactor via a discharge.

In at least some method alternatives, it may be preferable for a pyrolysis gas, preferably containing tar, from a pyrolysis reactor upstream of the fluidised bed reactor to be used as the combustible gas. Such a gas can consequently be provided and readily used. Furthermore, using the pyrolysis gas can lead to unloading of the tars contained in it.

According to another method variant, the gas containing oxygen is delivered to at least one inner porous and gas-permeable tube and subsequently flows through the pore system of the inner tube into an annular space between the inner tube and an outer tube. The combustible gas, on the other hand, flows from the fluidised bed of the fluidised bed reactor through an outer, porous, gas-permeable tube in the direction of the annular space between the inner and outer tubes. The combustible gas is finally oxidised by the gas containing oxygen in the annular space, and the at least partially oxidised gas is extracted from the fluidised bed reactor via a discharge.

In a manner which is simple in design terms and for easy method management, the combustible gas and/or the gas containing oxygen may be delivered via a nozzle floor of the fluidised bed reactor, the fluidisation gas of the fluidised bed reactor being delivered to the fluidised bed through the nozzle floor.

With the present invention, direct contact of oxygen with the coke particles formed from biomass can be substantially avoided. According to the invention, both allothermal and autothermal operation are possible. Here, oxygen is intended to mean a gas containing oxygen, but preferably technically pure oxygen.

A fluidised bed is intended here to mean any form of reaction zones with floating coke particles, which are formed from biomass. The fluidised bed may contain inert bed material, such as sand. The invention may be employed for a conventional stationery fluidised bed with and without sand, a circulating fluidised bed or a coke cloud.

A coke cloud in this context is intended to mean an arrangement of very many coke particles distributed in a gas flow, the particle size of which is so small that the coke particles are kept at least in suspensions by the process gas, for instance in the form of the pyrolysis gas, and in particular are transported further by the gas.

A structure forming the heater, which preferably has a large surface area and is at least partially gas-permeable, is arranged in the fluidised bed of the fluidised bed reactor.

Oxygen can be used, by oxidation or partial oxidation of a gas, in order to heat the structure which transfers its heat by thermal conduction, convection and thermal radiation to the fluidised bed. A structure for industrial application may preferably be formed essentially from a plurality and/or multiplicity of tubes. The tubes may be arranged in a large number in a fluidised bed of a fluidised bed reactor. Depending on the process management, some tubes may be gas-permeable and others gas-tight. For example, sintered tubes with a connected pore space, fabric or tubes which are perforated, are gas-permeable.

Advantageous process management can be achieved with tubes which have a porous structure, as are known from cartridge filters. Ceramic and metallic materials are suitable. The tubes may contain further tubes, which likewise have a gas-permeable structure or may be designed so as to be gas-impermeable.

The heating of the structures, in particular the outer tubes of the structures, may be carried out for example in the following way.

(a) The oxygen delivered to the structure, in particular to the tubes, flows through corresponding lines owing to the application of a sufficiently positive pressure difference, in which the pressure in the reaction space of the fluidised bed reactor is less than in the porous structure, from the inside outwards through the gas-permeable outer tube wall in the direction of the reaction space of the fluidised bed reactor. The gas contained in the fluidised bed reactor is then oxidised in the pores of the outer layer of the structure or immediately next to the structure. This oxidation leads to the structure being heated. In a structure with very small pores or fine perforation, the oxidation takes place immediately in the vicinity of the wall, the majority of the energy being used to the heat the tube. The oxidised or partially oxidised gases therefore remain in the fluidised bed reactor. The gasification is thus autothermal in this case.

(b) Owing to the application of a negative pressure difference, in which the pressure in the reaction space of the fluidised bed reactor is greater than in the porous structure, the gas of the fluidised bed reactor flows in the direction of the interior of the structure. In the pores of the wall or in the structure, the gas reacts with the oxygen delivered to the structure, and specifically as a function of the pressure difference. The oxidation preferably takes place on the inner wall similarly as in case (a). The oxidised or partially oxidised gases, i.e. the reaction products, are extracted from the tube for further use. This further use may, for example, consist in making the sensible heat usable for the overall process. The oxidised or partially oxidised gases may also be brought to a higher pressure level and delivered to the reaction space of the fluidised bed reactor.

(c) Particularly when the structure is constructed from a plurality of porous layers, and preferably a plurality of concentric porous tubes, any desired combustible gas may be used for heating the structure. The structure then preferably comprises at least two concentric, porous tubes. The combustible gas may be introduced into the intermediate space of the porous layers of the structure, particularly into the annular space between the concentric tubes, or into the interior of the structure or the interior of the respectively inner concentric tube. The oxygen is then introduced into the other respective space, the intermediate space, annular space or interior, so that the combustible gas and the oxygen are initially separated from one another by at least one layer or wall. If the oxygen is introduced for example into the inner gas-permeable tube and the gas into the annular gap, then with a positive pressure difference the oxygen flows into the annular space where the gas is at least partially oxidised. The inner tube therefore becomes hot and transmits the heat to the outer tube, which in turn transfers the heat to the fluidised bed of the fluidised bed reactor. If a pyrolysis gas containing tar is selected as the gas, it is desirable for the inner tube to reach a temperature which is as high as possible. In this case, it is advantageous to arrange an additional heat protection shield in the annular space, for instance in the form of a rolled perforated metal sheet, so that a high temperature can be reached in the corresponding intermediate space without the temperature in the reaction space increasing so greatly that ash melting can take place. The heat protection shield is therefore provided between the reaction zone and the outermost concentric, porous tube. The sheet metal for forming the heat protection shield may be configured so that the greatest possible turbulence occurs, so that the gas molecules come in contact with the hot tube wall as often as possible. In order to assist the tar breakdown, it is advantageous to catalytically coat at least the inner tube. For example, nickel-based catalysts from group VIII of the periodic table, which can be broken down by ammonia, are suitable for this. Doping of nickel-based catalysts with MgO, $ZrO_2$ or $ZrO_2$—$Al_2O_3$ is also advantageous. Owing to the catalytic tar breakdown of pyrolysis gas at elevated temperatures, a substantially tar-free synthesis gas is obtained.

If the outer tube is gas-permeable, the partially oxidised pyrolysis gas, the tar content of which has substantially been reacted catalytically and/or thermally, can flow into the fluidised bed reactor owing to the application of a corresponding pressure difference. The substantially tar-free pyrolysis gas may, however, also be extracted as synthesis gas from the annular space for further use. In this case, the outer tube may be gas-tight.

(d) The at least partial oxidation of the gas with oxygen may also take place outside the structure. In the simplest case, the at least partially oxidised gas then heats the structure when flowing through it. The structure then transfers the heat to the fluidised bed of the fluidised bed reactor. The at least partial oxidation of the gas may also take place entirely outside the fluidised bed reactor or immediately below the structure, in particular the tubes. The combining of combustible gas and oxygen may also take place inside the structure, particularly inside the tubes. In these cases as well, a gas-permeable tube may be advantageous, because the temperature differences in the axial direction can thereby be reduced.

If pyrolysis gas containing tar is used as the combustible gas, then it is advantageous to provide the structure, in particular the at least one inner tube, with a catalyst. The structure or the at least one tube may also be made of a catalytic material. All of the partially oxidised pyrolysis gas must then flow through at least one catalytically active structure, so that the tar content of the pyrolysis gas can be reduced even more significantly than in case (c).

If the combustible gas flows through the gas-permeable tube into the fluidised bed reactor owing to the application of a corresponding pressure difference, in order to be oxidised there, then this tube may also be provided with a catalyst. It is not compulsory to put the catalytic process inside the structure. This process may also be carried out in an apparatus outside the fluidised bed reactor.

A preliminary stage for the generation of pyrolysis gas is described in DE 198 07 988 A1. Patent Applications DE 10 2008 014 799 A1 and DE 10 2008 032 166 A1 also use preliminary stages in which pyrolysis gas containing tar is generated.

If the combustible gas, for instance pyrolysis gas containing tar, is not or not entirely used as fluidisation gas for the fluidised bed reactor, but instead is at least partially delivered to the structure for at least partial oxidation, then part of the gas of the fluidised bed reactor may be recycled and used as fluidisation gas in order to provide enough fluidisation gas for operation of the fluidised bed reactor. In this case, a recirculation blower may possibly be required which returns synthesis gas or pyrolysis gas from the output of the fluidised bed reactor to the input.

If pyrolysis gas is to be used to heat the structure, then it is recommendable first to scrub this gas and optionally rid it of catalyst poisons, such as sulphur. Hot gas desulphurisation is generally sufficient, and is known per se. Although dust can be detached from the tubes by a pressure impulse, as is conventional in the case of filter cartridges, sulphur compounds can lead to the formation of low melting point ashes, which become deposited in the tubes.

If the gas which has been introduced is to be fully oxidised with technically pure oxygen, this is possibly done only with a recycling blower. The temperatures occurring can be limited by recycling the partially oxidised gas, so that the structure is protected against excessively high temperatures. The generation of synthesis gas often follows another process for treating this gas to form gaseous or liquid substances, for example hydrogen, methane, methanol or propellants. When converting and purifying these products, combustible gases and steam are often formed, which can be used to heat the structure in the fluidised bed reactor, and can be used as a combustible gas in the manner described above. These may also be fractions with a high hydrogen component from which, by total oxidation, steam is obtained which can be very useful for the overall process. Steam, for example, is readily usable as a fluidisation gas for the fluidised bed reactor described here, for the homogeneous steam reaction (shift) or for methanisation.

The device according to the invention and the method according to the invention are suitable for pressurised process management as well as for a pressureless process. Pure oxygen is preferably used for larger pressurised plants, while air may be advantageous for small pressureless plants since the generation of small amounts of pure oxygen is comparatively cost-intensive.

In the described method, direct contact between the coke particles and the oxygen is avoided or at least significantly reduced. Instead, the heat is transmitted to the coke particles by radiation, convection and thermal conduction. Owing to the endothermic reaction of the coke conversion, the coke particles are preferably always cooler than the structure, the surrounding gas or a neighbouring sand particle, if present. The temperature difference between the coke particles and the structure can be controlled through the size of the structure surface, so that temperature differences of between 20° C. and 300° C. can be set up. The invention is therefore also suitable for biomasses with a low melting point. This applies to a large number of valuable biomasses of the crop type. Despite the use of oxygen, the reforming process can be carried out allothermally. This increases the product quality of the synthesis gas. The invention also allows thermally catalytic reduction of the tar content.

The fluidised bed reactor may be configured for the pyrolysis of solid fuels, such as biomass. The fluidised bed reactor may also be configured for the production of synthesis gas from solid fuels, preferably from a pyrolysis gas of the aforementioned pyrolysis. Optionally, the fluidised bed reactor may be configured for steam reforming, comprising pyrolysis in a first reactor part (pyrolysis reactor) and synthesis gas production in a second reactor part (synthesis gas reactor).

BRIEF DESCRIPTION OF THE DRAWINGS

The invention will be explained in more detail below with the aid of a drawing which merely represents exemplary embodiments. In the drawing.

DESCRIPTION OF THE PREFERRED EMBODIMENTS

Figure 1:
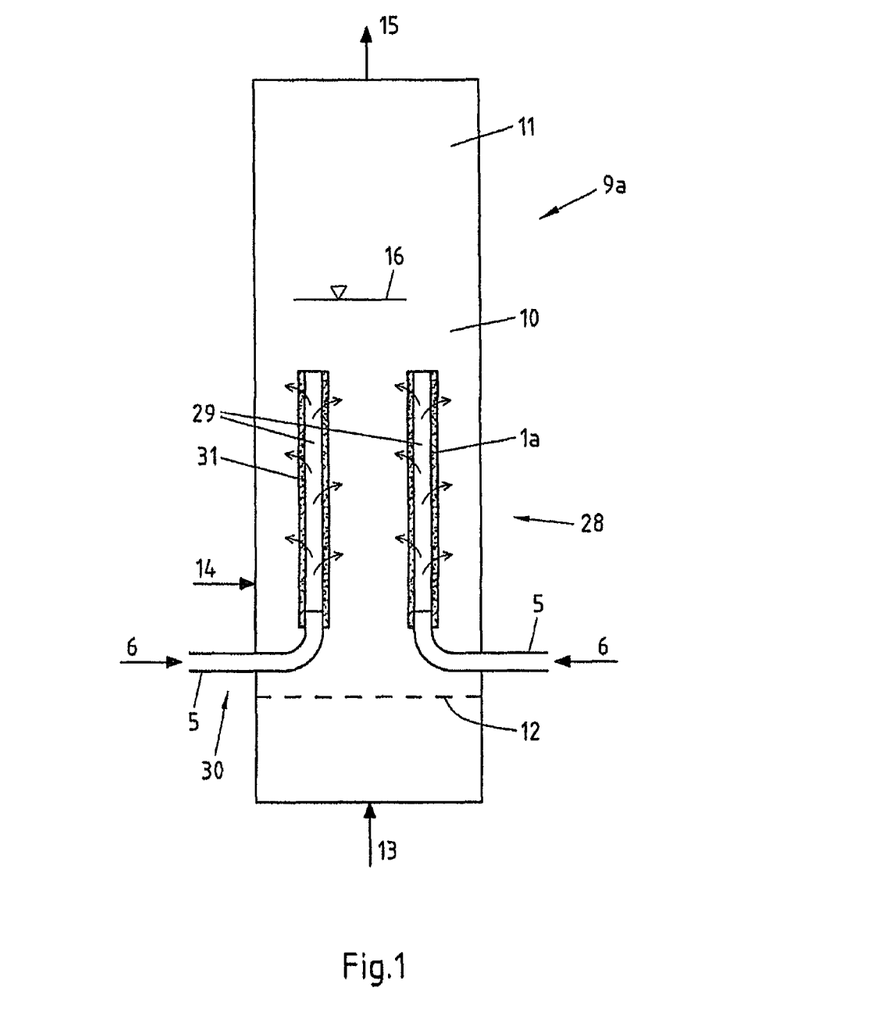
FIG. 1 shows a fluidised bed reactor with a stationary fluidised bed, in which oxygen is introduced through tubes with a porous wall.
Figure 2:
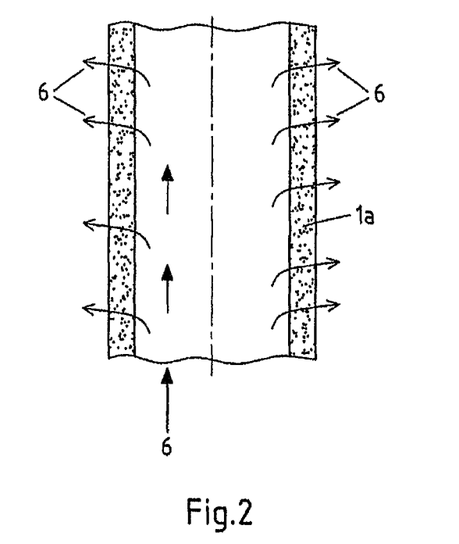
FIG. 2 shows a longitudinal section of the porous tube in FIG. 1.
Figure 3:
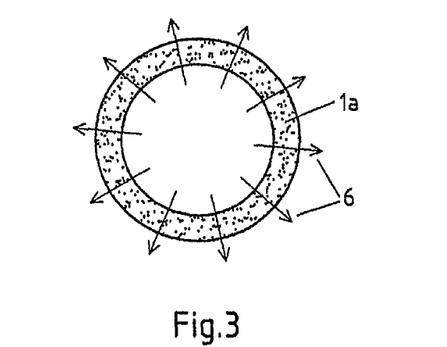
FIG. 3 shows a cross section of the porous tube in FIG. 1.

FIG. 1 shows a fluidised bed reactor $9a$ with a stationary fluidised bed 10 between a nozzle floor 12 and an upper end 16. In order to assist size reduction of the biomass, the fluidised bed may contain sand. The fluidised bed is fluidised by a fluidisation gas 13, for example steam and/or pyrolysis gas. Biomass 14 is delivered to the fluidised bed reactor via a supply component. The synthesis gas 15 generated in the fluidised bed reactor $9a$ passes through the space over the fluidised bed 11 (freeboard) and leaves the fluidised bed reactor $9a$ at the head end. The fluidised bed contains a heater 28 comprising a multiplicity of porous tubes $1a$ having a cavity 29, to which oxygen 6 is delivered via an oxygen feed 30 in the form of lines 5. The oxygen 6 flows through a porous, gas-permeable section 31 of the heater 28, formed by the porous tubes $1a$, in the direction of the fluidised bed 10.

The combustible gas from the fluidised bed 10 penetrates into the outer layer of the porous tubes $1a$ by diffusion and convection, and is oxidised there by the oxygen 6. The tube $1a$ is therefore heated, and transfers its heat to the fluidised bed 10 by thermal transmission. The coke particles the fluidised bed are predominantly heated indirectly by thermal conduction from sand and gas. Since the gasification of coke is endothermic, the coke particles are the coolest particles in the fluidised bed 10. The porosity and pore size of the tubes $1a$ are expediently selected so that the pressure loss of the oxygen is much greater than the pressure difference of the upper and lower ends of the fluidised bed 10. Approximately uniform heating is thereby achieved. At the same time, the porosity and the pore size of the tubes $1a$ are selected so that the coke particles cannot enter the pore system of the tubes $1a$ and come in contact with the oxygen 6 there.

Figure 4:
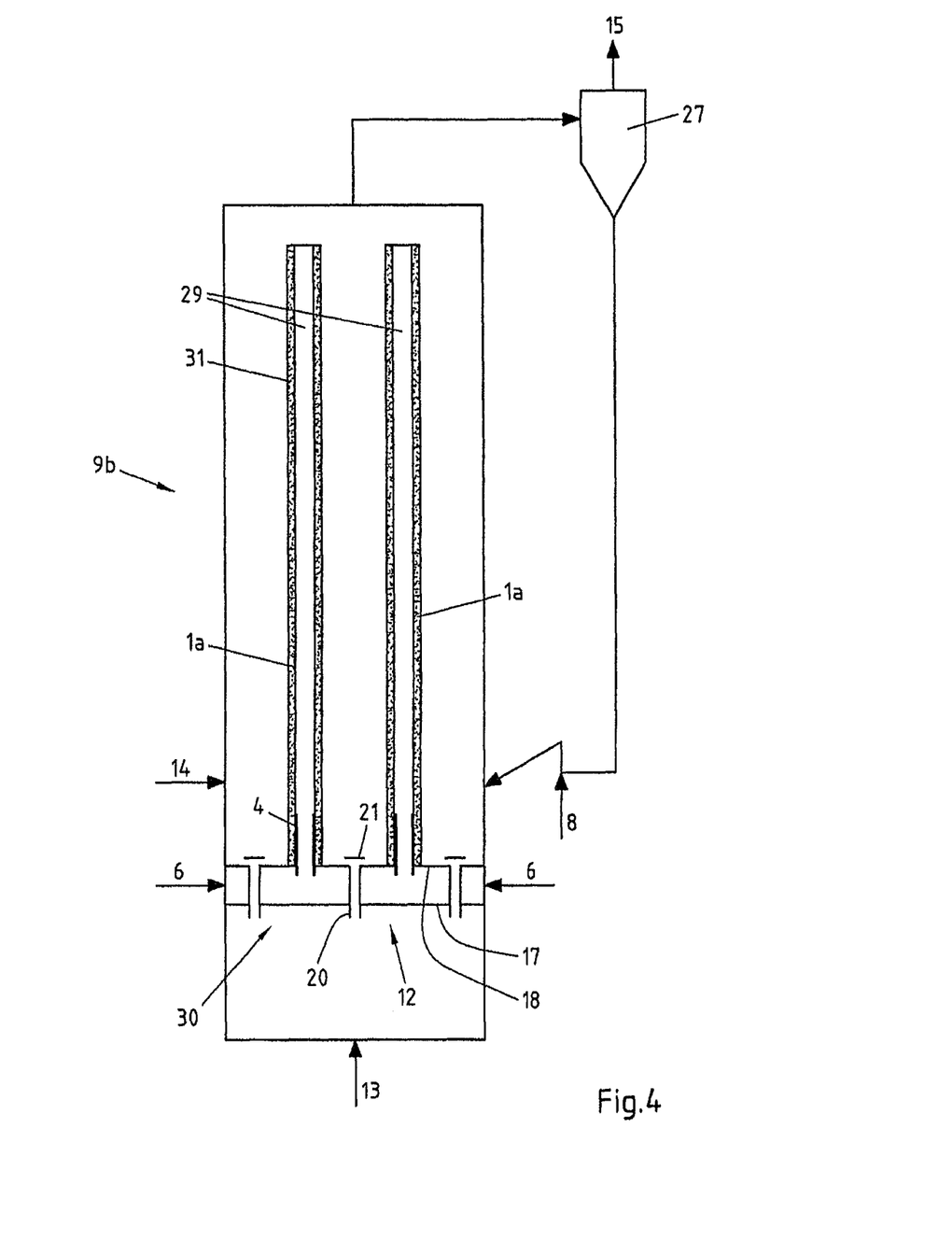
FIG. 4 shows a fluidised bed reactor with a circulating fluidised bed, in which oxygen is introduced through tubes with a porous wall.

FIG. 4 shows a fluidised bed reactor $9b$ with a circulating fluidised bed. In this type of reactor, the gas speed is so high that a stationary fluidised bed is not set up. The bed material of the fluidised bed 10 is constantly circulated in a manner known per se by means of a cyclone 27 and a siphon operated with siphon gas 8. The porous tubes $1a$ can therefore fill almost the entire reaction space. The nozzle floor 12 consists of a double floor formed by the plates 17 and 18. This double floor is used to distribute the oxygen 6. The oxygen 6 could also be distributed in another way.

According to experience, the heat transferred to the tubes $1a$ in the first centimeters on the nozzle floor is not as great as in the central part of the fluidised bed reactor $9b$. For this reason, it is expedient not to heat the tube $1a$ in the lower region, and not to make it porous there. This may be done by inserting or an encasing the tube $1a$ with a protective tube 4 in the form of a short gas-tight tube. Owing to the double floor, the fluidisation gas 13 is fed through a multiplicity of tube nozzles 20, which extend through the double floor formed by the plates 17 and 18. A plate is provided as a check valve 21. Besides the tubes $1a$, the fluidisation gas is fed to the fluidised bed reactor $9a$.

Figure 5:
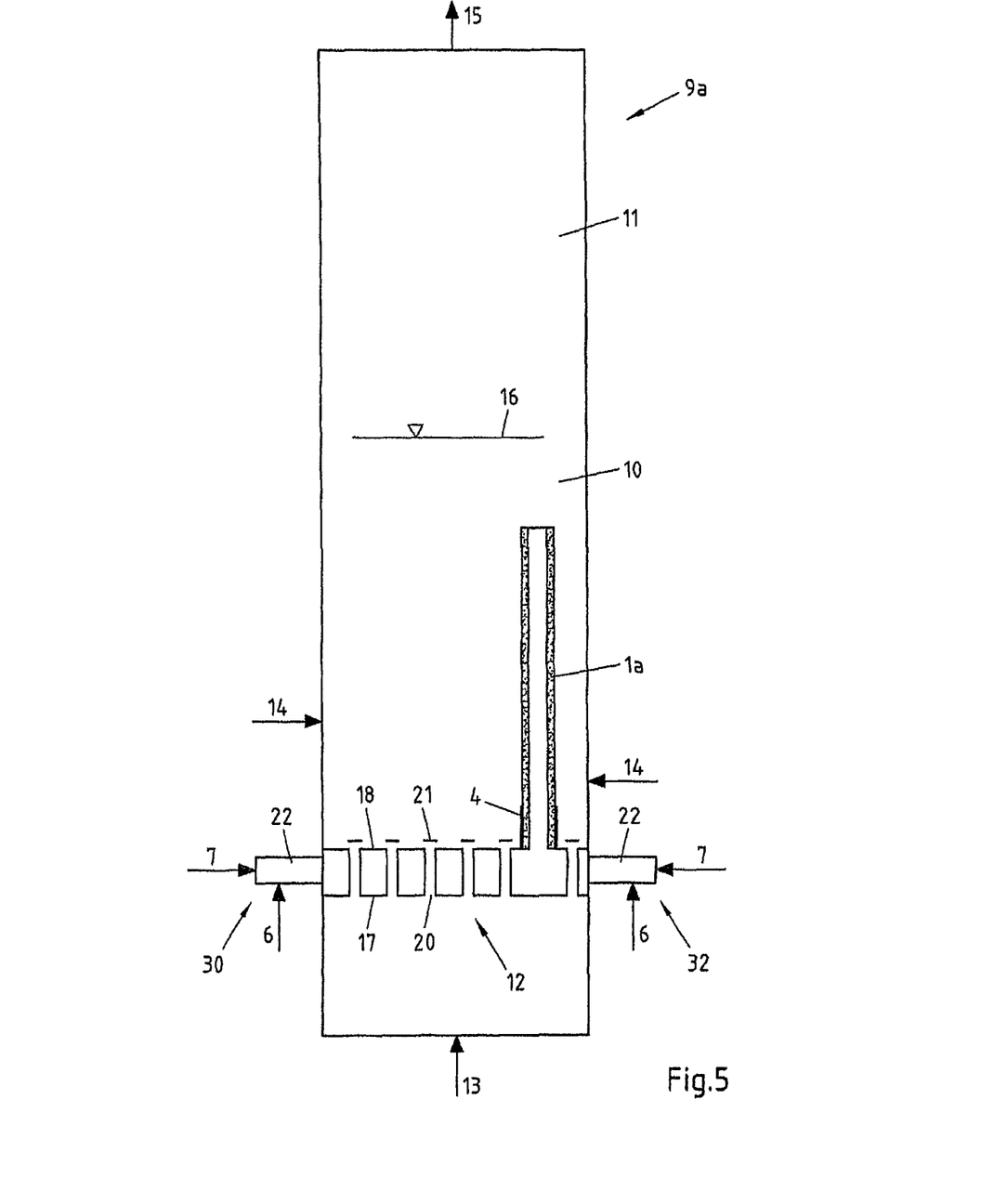
FIG. 5 shows a fluidised bed reactor with externally located oxidation.

FIG. 5 shows a fluidised bed reactor $9a$ with a stationary fluidised bed 10, in which any desired combustible gas 7 delivered from the outside through a combustible gas feed 32 is oxidised at least partially with oxygen 6 in an apparatus 22 provided for this. The heated and partially oxidised gas flows through a double floor, as described in FIG. 4, and through a multiplicity of porous tubes $1a$ into the fluidised bed 10. If the number of tubes $1a$ is large, the heat is predominantly transmitted to the fluidised bed by radiation, thermal conduction and convection. With a small number of tubes $1a$, the heat is transmitted by the partially oxidised gas itself. In both cases, the coke particles do not come in contact with oxygen.

This design is particularly suitable for the oxidation or partial oxidation of pyrolysis gases containing tar, which should preferably be de-dusted before the oxidation. The elevated temperature of the partially oxidised pyrolysis gas can be used for the catalytic breakdown of tars. This can be done by providing the tubes $1a$ with a catalyst, or arranging a catalytic reactor outside the fluidised bed reactor. In the event of strong overheating of the gas by partial oxidation or catalytic reactions, it should be ensured, for example by a multiplicity of tubes $1a$, that the temperature of the tubes $1a$ is not so high that the ash in the fluidised bed 10 melts.

Figure 6:
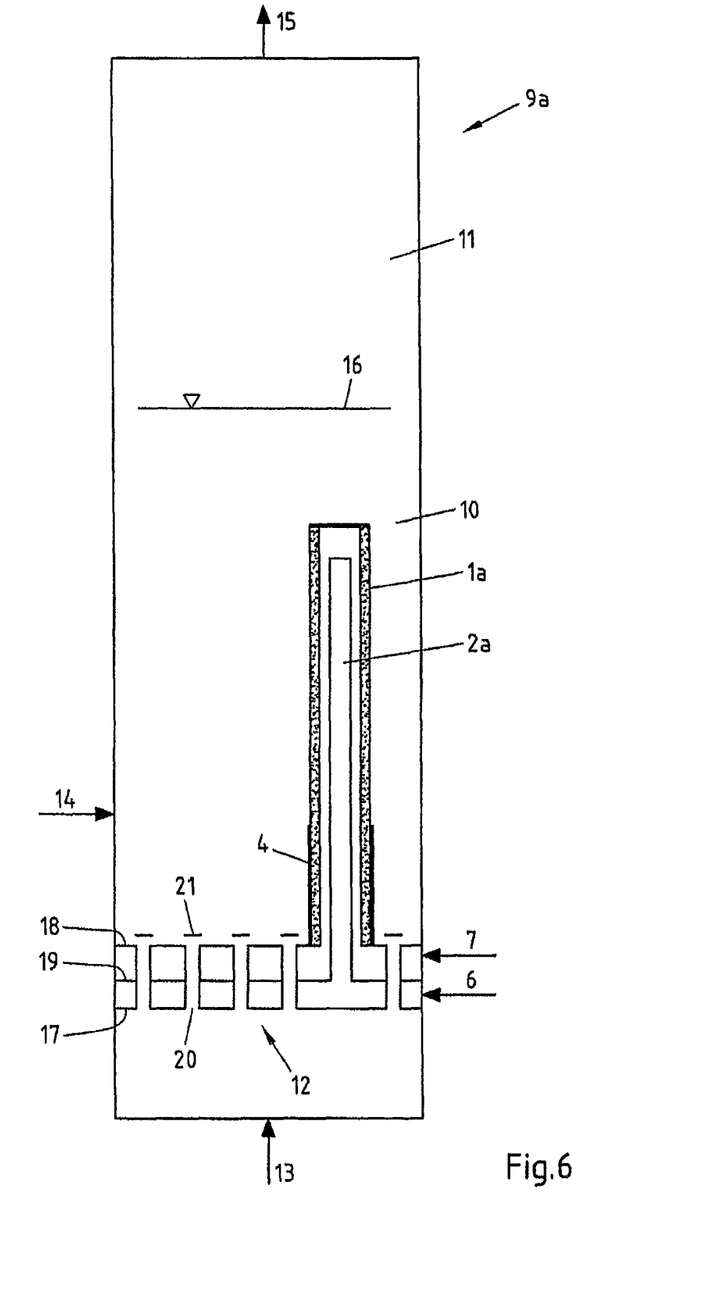
FIG. 6 shows a fluidised bed reactor with two concentrically arranged gas-permeable tubes.
Figure 7:
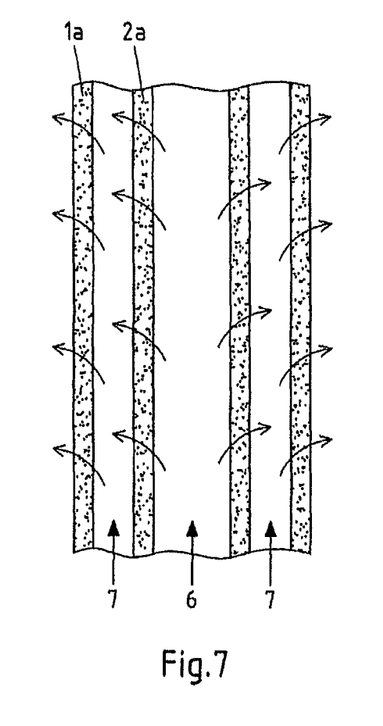
FIG. 7 shows a longitudinal section of the gas-permeable tubes in FIG. 6.
Figure 8:
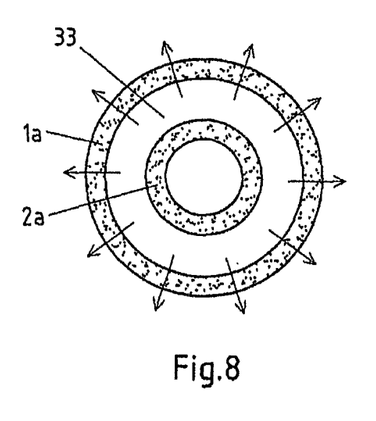
FIG. 8 shows a cross section of the gas-permeable tubes in FIG. 6.
Figure 9:
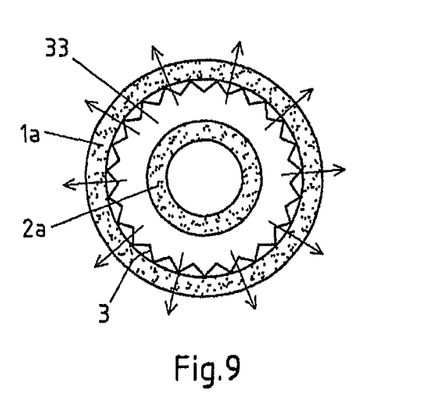
FIG. 9 shows a cross section of the gas-permeable tubes in FIG. 6 with a heat protection shield.

FIG. 6 shows a fluidised bed reactor $9a$ with a stationary fluidised bed 10, in which the tubes $1a$ contain a further concentrically arranged porous tube $2a$ whose porosity is selected so that coke particles cannot enter the pore system of the tubes, or at least cannot pass through the tube. The concentrically arranged tubes $1a$, $2a$ form an annular space 33 and allow stronger overheating of the combustible gas 7, because the oxidation or partial oxidation with oxygen 6 takes place at the inner tube $2a$ which transfers the heat predominantly as radiation to the outer tube $1a$. The temperature increase can be reinforced if an additional gas-permeable tube 3 is also arranged in the annular space. The tube 3 may for example be formed by a rolled metal sheet, in which the openings can be stamped so that sheet metal lugs remain as flow baffles on the sheet metal. This design is suitable in particular for the thermal/catalytic breakdown of tars. Preferably, at least the inner tube $2a$ should have a catalytically active layer or be made entirely of a catalytic material. The protective tube 4 should preferably be longer in this case so that, at the entry of the tube 3, the pyrolysis gas which is still cold and therefore contains tar cannot reach the fluidised bed reactor 9a. Rather, the tar molecules should be given the opportunity to enter into contact with the hot inner tube 2a. Instead of a metal sheet, the heat protection shield 3 may in this case also be formed as a porous tube with a catalytically active layer for tar breakdown.

As shown by FIGS. 6 to 9, the oxidised or partially oxidised gas 7 may be released into the fluidised bed 10. Here, the delivery of the gas 7 and the oxygen 6 takes place through a nozzle floor 12 that has two chambers, which are formed by the plates 17, 18 and 19.

Figure 10:
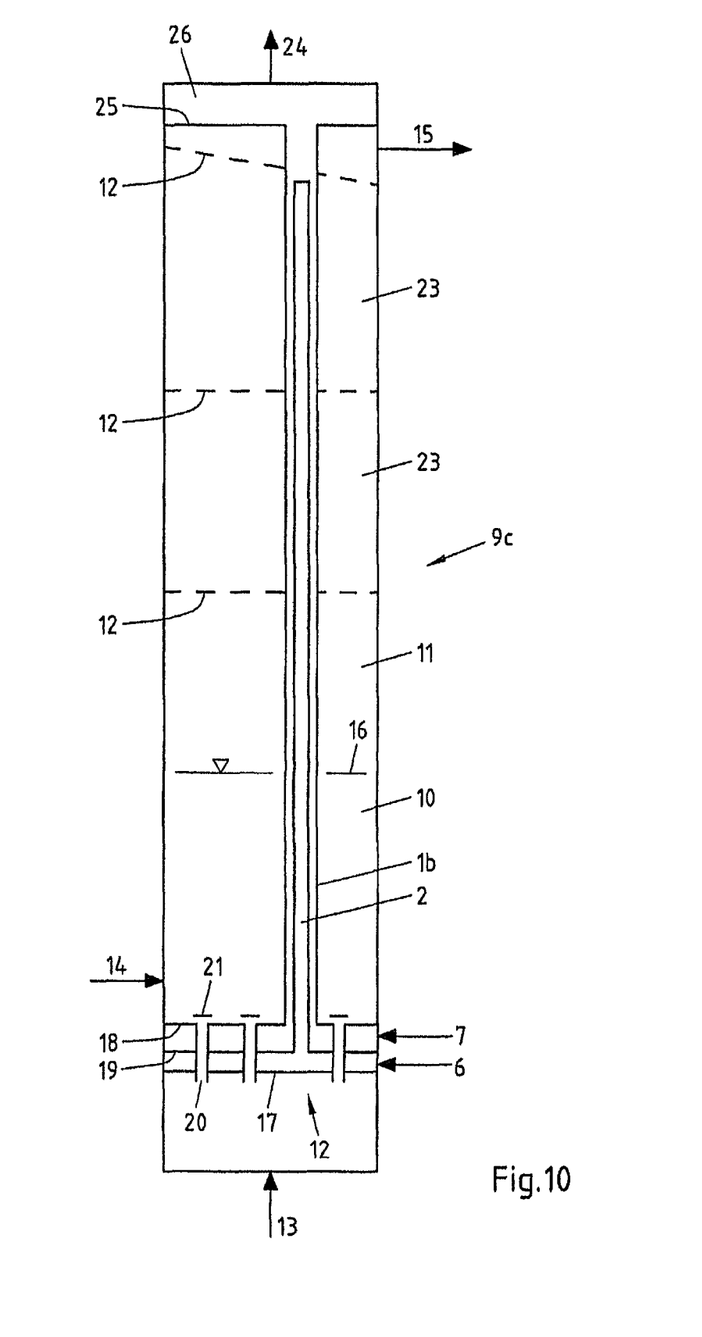
FIG. 10 shows a cascaded fluidised bed reactor with two concentrically arranged tubes, only the inner tube being gas-permeable.
Figure 11:
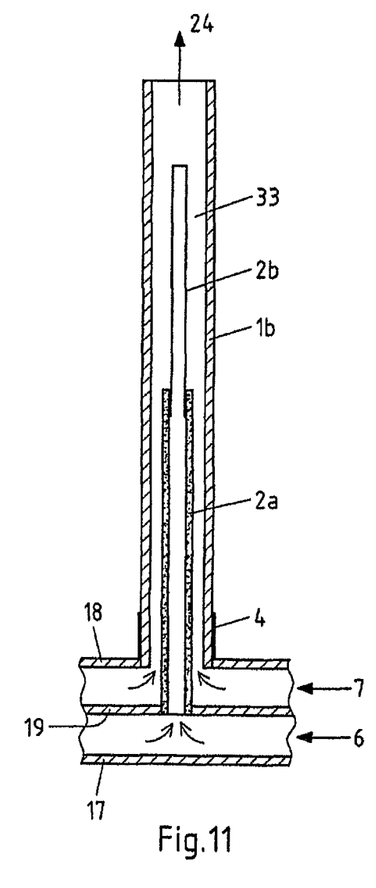
FIG. 11 shows a longitudinal section of the tubes in FIG. 10.
Figure 12:
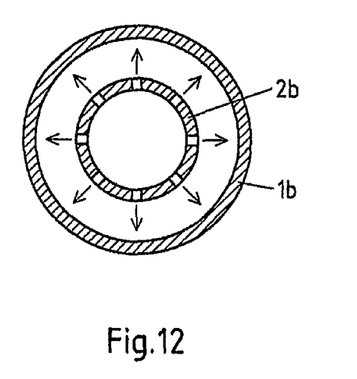
FIG. 12 shows a cross section of the tubes in FIG. 10.

FIG. 10 shows a cascaded fluidised bed reactor 9c with a stationary fluidised bed 10, which contains an inert bed material such as sand, and two further fluidised beds 23. These fluidised beds 23 consist only of coke clouds, which are raised from the fluidised bed 10. Between the further fluidised bed 23 and the stationary fluidised bed 10, there is a reaction space 11. As in FIG. 6, the structure is formed by a multiplicity of tubes 1b, each of which has an additional concentrically arranged inner tube 2a or 2b. The combustible gas 7 is introduced into the annular space, which is formed by the two tubes. The oxygen 6 is delivered to the inner tube 2a. In the region of the fluidised bed 10 containing sand, the inner tube 2a consists of a porous tube 2a, and in the region of the further fluidised beds 23 and the reaction space 11 it consists of a perforated tube 2b or a tube 2b with a higher flow resistance, which lets less oxygen 6 through than the porous tube in the stationary fluidised bed 10. This is expedient because the heat transfer in the stationary fluidised bed 10 is much greater than in the further fluidised beds 23 and the reaction space 11. The tube 1b is gas-impermeable. The oxidised or partially oxidised gas 24 must therefore be released into the space 26, which is formed by the intermediate floor 25. From there, it travels for further use in the overall process.

Figure 13:
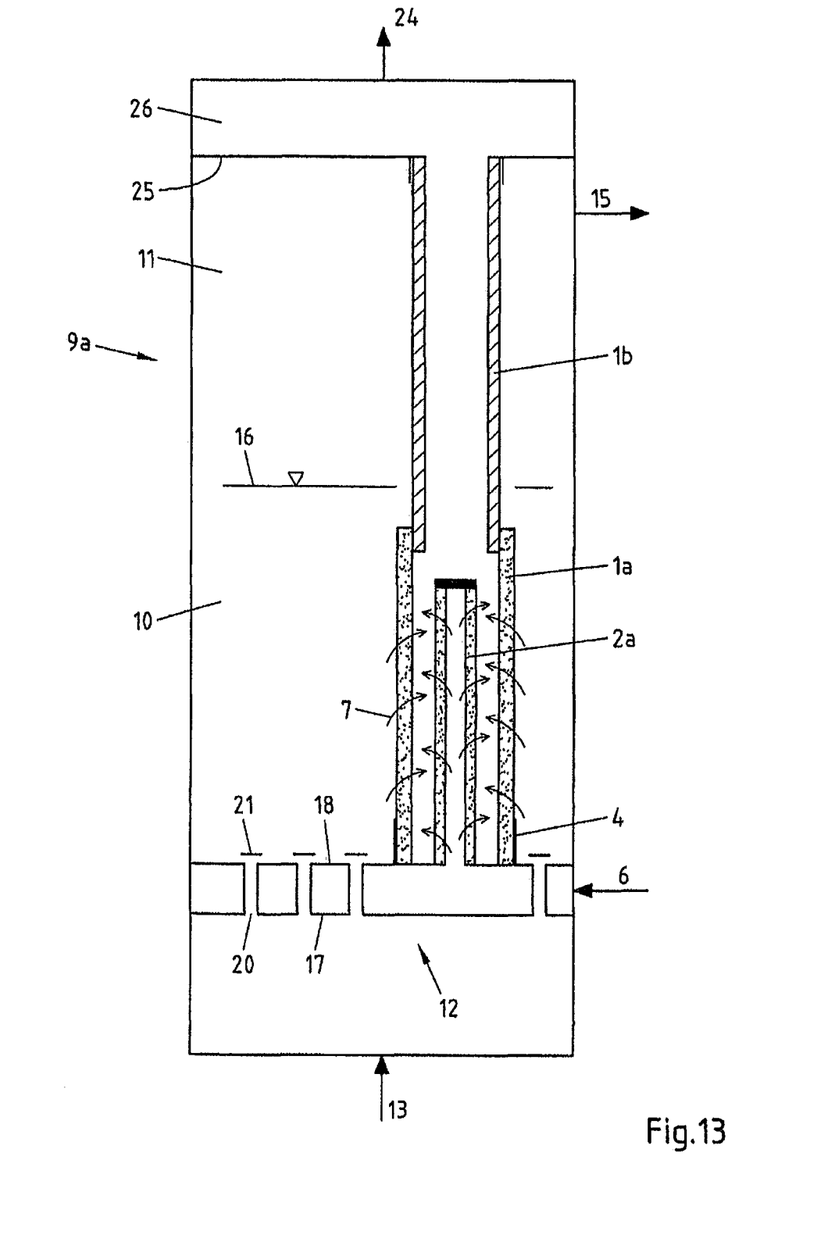
FIG. 13 shows a fluidised bed reactor in which the oxidation of a gas takes place on the inside of a porous tube.

FIG. 13 shows a fluidised bed reactor 9a with a multiplicity of porous tubes 1a in the region of the fluidised bed 10, which merge into a gas-tight tube 1b in the space over the fluidised bed. Each tube 1a contains a further concentrically arranged porous tube 2a which lets oxygen 6 flow into the annular space. The oxygen 6 flows through the double floor, formed by the plates 17 and 18, into the tubes 2a. The combustible gas 7 is in this case extracted from the fluidised bed 10 by applying a reduced pressure. The oxidised or partially oxidised gas 24 travels for further use in the overall process. The process can be categorised as an allothermal gasification method, because the synthesis gas is not laden with the carbon dioxide which is formed. The oxidised hydrogen and the oxidised carbon monoxide are constantly formed again in the fluidised bed, because the reaction is an equilibrium reaction.

LIST OF REFERENCES 1a heatable porous or perforated tube
1b heatable tube
2a porous inner tube
2b perforated inner tube
3 heat protection shield
4 protective tube for the sealing the inflow region
5 feed tube
6 oxygen
7 combustible gas
8 siphon gas
9a fluidised bed reactor with stationary fluidised bed
9b fluidised bed reactor with circulating fluidised bed
9c multistage fluidised bed reactor
10 stationary fluidised bed
11 space over the fluidised bed (freeboard)
12 nozzle floor
13 fluidisation gas
14 biomass or coke (residual coke)
15 synthesis gas or product gas
16 upper limit of the stationary fluidised bed
17 upper plate of the nozzle floor
18 lower plate of the nozzle floor
19 middle plate of the nozzle floor
20 nozzle in the nozzle floor
21 check valve over the nozzle
22 burner
23 fluidisation stages for coke
24 gas for further use in the overall process
25 intermediate floor
26 gas collection space
27 cyclone
28 heater
29 cavity
30 oxygen feed
31 porous, gas-permeable section
32 combustible gas feed
33 annular space

The invention claimed is:

1. A fluidised bed reactor for producing synthesis gas by gasification of solid fuels, having a heater for heating a fluidised bed of the fluidised bed reactor, the heater having at least one cavity,
   wherein the heater has an oxygen feed for delivering a gas containing oxygen into the cavity of the heater and the cavity adjoins a porous, gas-permeable section of the heater, and
   wherein the heater is located within the fluidized bed of the reactor and comprises a plurality of tubes arranged concentrically with one another, respectively with an inner tube and an outer tube, at least the inner tube or the outer tube being formed so that it is porous and gas-permeable and the oxygen feed is formed so as to deliver the gas containing oxygen to an annular space between the outer tube and the inner tube.

2. The fluidised bed reactor according to claim 1, wherein both the respective inner tube and the respective outer tube are formed so as to be porous and gas-permeable.

3. The fluidised bed reactor according to claim 1, wherein at least one further porous and gas-permeable, tube and/or at least one gas-permeable heat protection shield is provided in the annular space between the outer tube and the inner tube.

4. The fluidised bed reactor according to claim 1, wherein the outer tube is enclosed by at least one gas-impermeable casing.

5. The fluidised bed reactor according to claim 1, wherein the oxygen feed comprises a nozzle floor for delivering gas containing oxygen to the cavity and simultaneously for delivering fluidisation gas to the fluidised bed of the fluidised bed reactor.

6. The fluidised bed reactor according to claim 5, wherein the combustible gas feed is integrated into the nozzle floor, in order to simultaneously deliver the gas containing oxygen and the combustible gas to the cavity and fluidisation gas to the fluidised bed of the fluidised bed reactor.

7. The fluidised bed reactor according to claim 1, wherein the heater is provided in a coke cloud bed without inert bed material.

8. The fluidised bed reactor according to claim 1, wherein the porous, gas-permeable section of the heater, at least locally comprises a catalyst material and/or is made of a catalyst material.

9. The fluidised bed reactor according to claim 1, wherein the porous, gas-permeable section is electrically heatable.

10. The fluidised bed reactor according to claim 1, wherein the heater is located in a lower portion of the reactor near an inlet for fluidization gas.

11. The fluidised bed reactor according to claim 1, wherein at least a portion of the heater is located adjacent a nozzle floor of the reactor.

\* \* \* \* \*